United States Patent [19]

Haitko et al.

[11] Patent Number: 4,988,821
[45] Date of Patent: Jan. 29, 1991

[54] LIQUID CRYSTALLINE POLYESTERETHERIMIDES AND INTERMEDIATES THEREFOR

[75] Inventors: Deborah A. Haitko, Schenectady; David N. Schissel, Clifton Park, both of N.Y.

[73] Assignee: General Electric Company, Schenectady, N.Y.

[21] Appl. No.: 397,208

[22] Filed: Aug. 23, 1989

[51] Int. Cl.$^5$ ............................................. C07D 403/10
[52] U.S. Cl. .................................................. 548/461
[58] Field of Search ......................................... 548/461

[56] References Cited

U.S. PATENT DOCUMENTS

| | | | |
|---|---|---|---|
| 4,383,105 | 5/1983 | Irwin | 528/170 |
| 4,728,713 | 3/1988 | Hisgen et al. | 528/183 |
| 4,728,714 | 3/1988 | Hisgen et al. | 528/183 |
| 4,762,906 | 8/1988 | Hisgen et al. | 528/170 |

FOREIGN PATENT DOCUMENTS 2264013  11/1975  France ................................. 548/461

OTHER PUBLICATIONS

Kricheldorf et al., *Macromolecules*, 21, 1929–1935 (1988).
Kricheldorf et al., *J. Poly. Sci., Polymer Letters Ed.*, 23, 413–419 (1985).
Kricheldorf et al., *Polymer*, 28, 1772–1778 (1987).

*Primary Examiner*—Mary E. Ceperley
*Attorney, Agent, or Firm*—William H. Pittman; James C. Davis, Jr.

[57] ABSTRACT

Liquid crystalline polyesteretherimides are prepared by a transesterification reaction involving hydroquinone, 4,4'-biphenol or 2,6-dihydroxynaphthalene and esters of certain bisimidodicarboxylic acids, or from the free bisimidodicarboxylic acids and esters of the dihydroxyaromatic compounds. In addition to being liquid crystalline, the polyesteretherimides are crystalline in the solid state and have relatively high glass transition temperatures.

3 Claims, No Drawings

LIQUID CRYSTALLINE POLYESTERETHERIMIDES AND INTERMEDIATES THEREFOR boxylic acids. The invention also includes the novel bisimidodicarboxylic acid intermediates.

In one of its aspects, therefore, the invention includes liquid crystalline polyesteretherimides comprising structural units of the formula

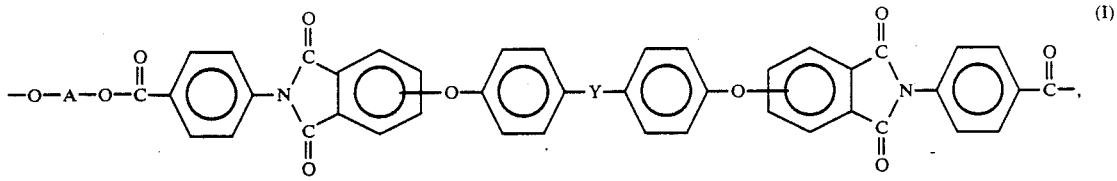

wherein A is

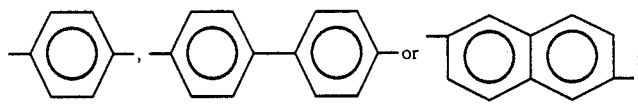

Y is

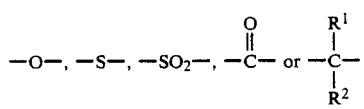

and each of $R^1$ and $R^2$ is independently hydrogen, methyl or ethyl.

It will be apparent from formula I that the polyesteretherimides of this invention are derived from bisimidodicarboxylic acids. Such acids and their functional derivatives (e.g., acid halides, amides, esters and salts) are another aspect of the invention. They are represented by the formula

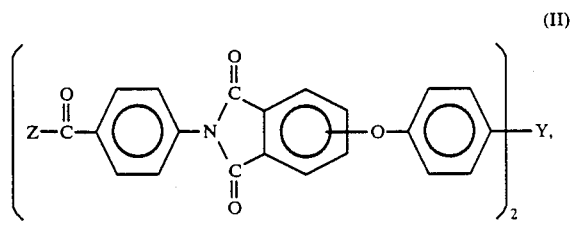

wherein Y is as previously defined; Z is OH, $OR^3$, OM or $NR^3R^4$; M is one equivalent of a metal or ammonium cation; and each of $R^3$ and $R^4$ is independently an organic radical.

This invention relates to liquid crystalline polymers, and more particularly to a novel class of such polymers and intermediates for their preparation.

Thermotropic liquid crystalline polymers are characterized by a rigid rod structure which remains rigid in the melt, whereby the polymer molecules line up in a single direction upon application of a shearing force. They remain so aligned upon cooling, and are thus self-reinforcing in one direction; as a result, they may be formulated into high-strength fibers. Other favorable characteristics are excellent thermal properties and excellent flow properties at high temperatures, which make melt processing easy.

Various polyesterimides having actual or potential thermotropic liquid crystalline properties are known. Reference is made, for example, to U.S. Pat. Nos. 4,383,105, 4,728,713, 4,728,714 and 4,762,906; Krichel-dorf et al., *Macromolecules* 21, 1929-1935 (1988); Kricheldorf et al., *J. Poly. Sci., Polymer Letters Ed.*, 23, 413-14 419 (1985); and Kricheldorf et al., *Polymer*, 28, 1772-1778 (1987). For the most part, said polyesterimides are derived from trimellitic acid (benzene-1,2,4-tricarboxylic acid), or the structurally related compound bis(3,4-dicarboxy)benzophenone.

Also known are polyetherimides characterized by numerous beneficial properties, including high thermal stability and solvent resistance. A particularly valuable genus of polyetherimides consists of those derived from the tetracarboxylic acids 2,2-bis[4-(3,4-dicarboxy-phenoxy)phenyl]propane (the dianhydride of which is sometimes hereinafter designated "BPADA") and its 2,3-dicarboxy isomer. It would be desirable to combine the properties of these polyetherimides with those of liquid crystalline polymers. However, the presence of liquid crystalline behavior cannot be predicted merely on the basis of a polymer's molecular structure.

The present invention is based on the discovery of a class of liquid crystalline polyesteretherimides, comprising structural units derived from bisimidodicarboxylic acid derivatives of the above-identified tetracar- In formula II, the identity of Z varies according to whether the compound is a free carboxylic acid or an ester, salt or amide thereof. In the esters and amides, each of $R^3$ and $R^4$ is independently an organic radical, most often a $C_{1-8}$ alkyl or $C_{6-10}$ aromatic hydrocarbon radical. In the esters, $R^3$ is usually a $C_{6-10}$ aromatic hydrocarbon radical and preferably phenyl, since phenyl esters are particularly suitable for preparation of polyesteretherimides by transesterification.

In the salts, M may be one equivalent of a metal or ammonium cation. The preferred metals are usually the alkali and alkaline earth metals. Ammonium cations include those which are unsubstituted and substituted, the latter including various amine cations. For the most part, however, the preferred compounds of formula II are the free carboxylic acids, in which Z is OH.

The Y value is as previously defined and is usually

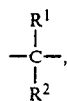

in which each of R¹ and R² may be hydrogen, methyl or ethyl. Particularly preferred are the compounds in which R¹ and R² are each methyl.

Thus, the preferred bisimidodicarboxylic acids are the N-bis(4-carboxyphenyl) imides of the 2,2-bis[4-(dicarboxyphenoxy)phenyl]propanes. Within this class, the bis(3,4-dicarboxy) isomer is most preferred since it is convertible to liquid crystalline polymers having particularly desirable properties.

The bisimidodicarboxylic acids of this invention may be prepared by the reaction of the corresponding 2,2-bis[4-(dicarboxyphenoxy)phenyl]propane, or a functional derivative thereof and especially the dianhydride, with p-aminobenzoic acid, under conventional imide-producing conditions. In general, the molar ratio of p-aminobenzoic acid to dianhydride is about 2:1, the reaction temperature is in the range of about 150°–200° C. and a suitable solvent, typically a relatively high boiling chlorinated aromatic compound such as o-dichlorobenzene or 1,2,4-trichlorobenzene, is employed.

In formula I, the A values are derived from the dihydroxyaromatic compounds hydroquinone, 4,4'-biphenol and 2,6-dihydroxynaphthalene. The structures of these compounds and of the bisimidodicarboxylic acids of formula II indicate the most convenient methods for preparation of the polyesteretherimides; namely, by reactions between the aforementioned dihydroxyaromatic compounds and bisimidodicarboxylic acids, or functional derivatives thereof. In general, the most feasible reactions of this type are transesterification reactions involving the free bisimidodicarboxylic acids and diesters of the dihydroxyaromatic compounds, typically with $C_{2-8}$ aliphatic carboxylic acids and especially acetic acid.

It is also within the scope of the invention to prepare the polyesteretherimides by the reaction of the free dihydroxyaromatic compounds with such esters of the bisimidodicarboxylic acids as the diphenyl esters. Alternatively, an in situ ester preparation and transesterification procedure may be employed, in which a combination of the free bisimidodicarboxylic acid and dihydroxyaromatic compound and an esterification agent for the latter, typically acetic anhydride, is heated under reaction conditions.

Any of the aforementioned transesterification reactions may be conducted conventionally, typically employing the polyesteretherimide-forming reactants in substantially equimolar quantities although the proportions may be varied slightly to provide molecular weight control. Either solution or melt reaction conditions may be employed, with solution reactions typically taking place in relatively high boiling solvents such as the aforementioned o-dichlorobenzene or 1,2,4-trichlorobenzene.

The polyesteretherimides of this invention are crystalline in the solid state, and are anisotropic and highly birefringent upon melting and up to temperatures in excess of 375° C. They undergo reproducible transition between the liquid and crystalline solid state, as demonstrated by the existence of a detectable melting temperature upon reheating. In addition, they have relatively high glass transition temperatures.

The invention is illustrated by the following examples.

EXAMPLE 1

A 1-liter 3-necked flask equipped with a stirrer, thermometer and reflux condenser was charged with 20 grams (38.5 mmol.) of BPADA, 10.5 grams (76.9 mmol.) of p-aminobenzoic acid and 300 ml. of o-dichlorobenzene. The mixture was heated under reflux for 3 hours, with stirring, and cooled to room temperature whereupon a white flocculent precipitate formed. It was filtered, rinsed with ethyl ether and dried in vacuum at 120° C. Based upon method of preparation, the product was the desired 2,2-bis{4-3,4-dicarboxyphenoxy)phenyl]propane bis(p-carboxyphenyl)imide. Its melting point was 331° C. The yield was 27.9 grams, or 96% of theoretical.

EXAMPLE 2

A mixture of 6.0 grams (7.92 mmol.) of the product of Example 1 and 1.54 grams (7.92 mmol.) of hydroquinone diacetate was heated in a nitrogen atmosphere for 4 hours at 300° C., with stirring and removal of acetic acid by distillation. The mixture was cooled, removed from the vessel and ground to a fine powder which was annealed in a nitrogen atmosphere for 24 hours at 264° C. It was analyzed by differential scanning calorimetry, hot-stage polarized light microscopy and thermal gravimetry and was shown to be the desired liquid crystalline polyesteretherimide.

EXAMPLE 3

The procedure of Example 2 was repeated, replacing the hydroquinone diacetate on an equimolar basis with 4,4'-biphenyl diacetate. A similar product was obtained.

EXAMPLE 4

The procedure of Example 2 was repeated, replacing the hydroquinone diacetate on an equimolar basis with 2,6-diacetoxynaphthalene. A similar product was obtained.

The properties of the products prepared in Examples 2–4 are listed in the following table.

| | Example | | |
|---|---|---|---|
| | 2 | 3 | 4 |
| Tg, °C. | 200 | 186 | 191 |
| Melting temp., °C. (2nd DSC heating cycle) | 326 | 328 | 326 |
| Crystallization temp., °C. (DSC cooling cycle) | 234 | — | 220* |
| 5% wt. loss temp., °C. (TGA) | 510 | 498 | 489 |

*Second heating/cooling cycle; none detected in first cycle.

What is claimed is:

1. A bisimidodicarboxylic acid or functional derivative thereof having the formula

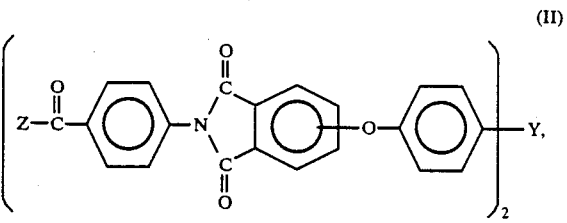

(II)

wherein Y is

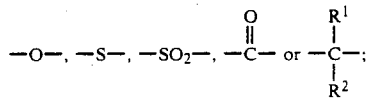

Z is OH, OR³, OM or NR³R⁴; M is one equivalent of a metal or ammonium cation; each of R¹ and R² is independently hydrogen, methyl or ethyl; and each of R³ and R⁴ is independently a $C_{1-8}$ alkyl or $C_{6-10}$ aromatic hydrocarbon radical.

2. A bisimidodicarboxylic acid according to claim 1 wherein Z is OH.

3. A bisimidodicarboxylic acid according to claim 2 wherein Y is isopropylidene.

* * * * *